No. 659,083.  Patented Oct. 2, 1900.
J. MABUS.
INCUBATOR.
(Application filed Feb. 7, 1900.)
(No Model.)
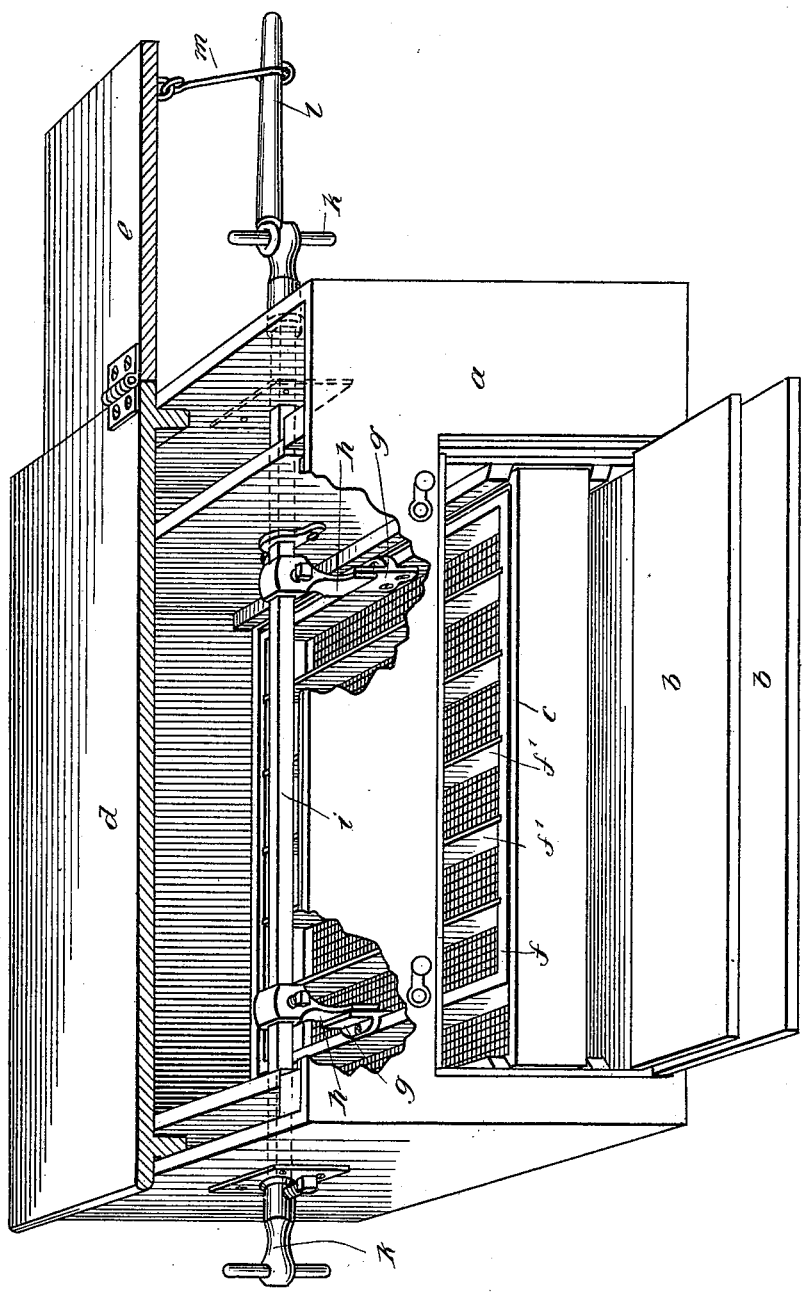
WITNESSES:
INVENTOR
John Mabus
BY
ATTORNEYS

UNITED STATES PATENT OFFICE.

JOHN MABUS, OF MINIER, ILLINOIS.

INCUBATOR.

SPECIFICATION forming part of Letters Patent No. 659,083, dated October 2, 1900.

Application filed February 7, 1900. Serial No. 4,363. (No model.)

*To all whom it may concern:*

Be it known that I, JOHN MABUS, a citizen of the United States, and a resident of Minier, in the county of Tazewell and State of Illinois, have invented a new and Improved Incubator, of which the following is a full, clear, and exact description.

The purpose of this invention is to provide means for conveniently and effectively turning eggs in an incubator without necessitating opening the incubator.

This specification is the disclosure of one form of the invention, while the claims define the actual scope thereof.

Reference is to be had to the accompanying drawing, forming a part of this specification, in which the figure represents a perspective view of an incubator, parts of which are broken away to show my invention applied thereto.

The incubator $a$ may be of the usual construction, provided with doors $b$ at the side, facilitating introducing and removing the tray $c$, whereon the eggs are carried. The incubator also has a top $d$ and a hinged leaf $e$, commonly known as the "yard," on which the chicks may be placed when hatched.

Mounted on the tray $c$ so as to slide longitudinally thereon is a rectangular frame $f$, provided with cross-strips $f'$, and these cross-strips are adapted to extend between the rows of eggs, so that when the frame $f$ is reciprocated on the tray the eggs will be rolled over. Each end of the frame $f$ is provided with an upwardly-extending lug $g$, the lugs being situated, respectively, at approximately the middle of the end portions of the frame, so as to be engaged at their inner sides by fingers $h$, fastened to and projecting downward from an angular bar $i$, which is mounted longitudinally in the incubator and is reciprocal therein. Now it is clear that as the bar $i$ is reciprocated the frame $f$ will be moved in a like manner, which is due to the engagement of the fingers $h$ with the lugs $g$, at the inner faces of the latter. It is also clear that the parts $g$ and $h$ will not interfere with the sidewise movement of the tray $c$ and the frame $f$, which movement is effected when the tray is placed in or displaced from the incubator, it being understood that the tray slides sidewise through the opening in the incubator which is commanded by the doors $b$.

The end portions of the bar $i$ are projected beyond the ends of the incubator and respectively provided with handles $k$, facilitating the reciprocation of the bar. When one or more leaves $e$ are in the extended position shown, an extension handle-section $l$ may be provided for each handle $k$. One of these extension handle-sections $l$ is shown in the drawing, and it will be seen that by this device the operator may readily move the bar $i$ without necessitating the inconvenience of reaching under the extension-leaf $e$. For holding the handle-section $l$ in convenient and proper position when the handle is not being used a link $m$ is provided, which has hooks at its ends to engage eyes respectively on the handle-section $l$ and on the leaf $e$. I do not confine myself to the precise form of the devices $k$, $l$, and $m$ or to other means for actuating the bar $i$. Also it will be apparent that the invention is applicable to incubators having a plurality of trays.

Having thus described my invention, I claim as new and desire to secure by Letters Patent—

1. The combination, with an incubator having a member movable longitudinally to turn the eggs, and movable transversely to be passed in and out of the incubator, of a reciprocatory bar, fingers attached to said bar, and lugs or projections fastened on the said member of the incubator, the fingers of the bar being respectively engaged with the inner faces of the lugs or projections.

2. The combination with an incubator having a member reciprocatory longitudinally to turn the eggs, and movable transversely to be passed in and out of the incubator, of a reciprocatory bar mounted in the incubator, and means loosely connecting the bar with the said member of the incubator, by which to impart reciprocatory movement to said member.

3. The combination with an incubator, of a member mounted therein and to turn the eggs, and movable transversely to be passed in and out of the incubator, lugs or projections carried by said member, fingers respectively loosely engaged with the inner faces of the lugs or projections, and means for causing the fingers to reciprocate, whereby to drive the said member of the incubator.

4. The combination, with an incubator having a transversely-movable tray, of a frame mounted in the tray and reciprocatory therein to turn the eggs, the frame being movable transversely with the tray, lugs or projections extending up from the end portions of the frame, a reciprocatory bar, and fingers carried by the bar and respectively loosely engaged with the inner faces of the lugs or projections.

5. The combination with an incubator, of a member mounted therein and movable to turn the eggs, a lug or projection extending up from said frame, a reciprocatory bar, and a finger carried by the bar and loosely engaging one side of the lug or projection.

In testimony whereof I have signed my name to this specification in the presence of two subscribing witnesses.

JOHN MABUS.

Witnesses:
T. L. TANNER,
WM. H. LOWER.